US010405234B2

(12) United States Patent
Roy et al.

(10) Patent No.: US 10,405,234 B2
(45) Date of Patent: Sep. 3, 2019

(54) LOAD BALANCING OF COMMITTED INFORMATION RATE SERVICE SESSIONS ON TDMA INROUTE CHANNELS

(71) Applicant: Hughes Network Systems, LLC, Germantown, MD (US)

(72) Inventors: Satyajit Roy, Gaithersburg, MD (US); Hanny Kadrichu, North Potomac, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 949 days.

(21) Appl. No.: 14/580,671

(22) Filed: Dec. 23, 2014

(65) Prior Publication Data

US 2016/0183126 A1 Jun. 23, 2016

(51) Int. Cl.
*H04W 28/08* (2009.01)
*H04W 28/26* (2009.01)
*H04B 7/185* (2006.01)
*H04J 3/16* (2006.01)
*H04W 28/02* (2009.01)
(Continued)

(52) U.S. Cl.
CPC ...... *H04W 28/085* (2013.01); *H04B 7/18513* (2013.01); *H04B 7/18578* (2013.01); *H04B 7/2046* (2013.01); *H04J 3/1694* (2013.01); *H04W 28/0268* (2013.01); *H04W 28/26* (2013.01); *H04L 47/125* (2013.01)

(58) Field of Classification Search
CPC ............ H04B 7/18513; H04B 7/18578; H04B 7/2046; H04L 47/125; H04W 28/26; H04W 28/0268; H04W 28/085
See application file for complete search history.

(56) References Cited

U.S. PATENT DOCUMENTS

2008/0240146 A1* 10/2008 Singh ................. H04N 21/4122
370/458
2009/0252134 A1 10/2009 Schlicht et al.

FOREIGN PATENT DOCUMENTS

WO 2010054394 A2 5/2010

OTHER PUBLICATIONS

International Search Report and the Written Opinion for International App No. PCT/US2015/067142, dated Apr. 18, 2016, European Patent Office, Authorized Officer: Lafitte-De Jong, Sandrine.

* cited by examiner

*Primary Examiner* — Mansour Oveissi
(74) *Attorney, Agent, or Firm* — Sheppard, Mullin, Richter & Hampton LLP (57) ABSTRACT

Systems and methods provide load balancing on time division multiple access (TDMA) inroute channels of a satellite network. A bandwidth allocation manager or module can employ smart admission techniques to admit new terminals based upon the available bandwidth capacities of TDMA inroute channels including committed information rate (CIR) bandwidth requirements of already admitted terminals and current and CIR bandwidth requirements of the new terminals. Attempts are made to fully load a first TDMA inroute channel before providing admission to a second TDMA inroute channel. Additionally, an already admitted terminal requesting increased bandwidth or one or more other already admitted terminals may be reassigned to one or more alternative TDMA inroute channels to accommodate the requested increase in bandwidth.

25 Claims, 8 Drawing Sheets

(51) Int. Cl.
*H04B 7/204* (2006.01)
*H04L 12/803* (2013.01)

LOAD BALANCING OF COMMITTED INFORMATION RATE SERVICE SESSIONS ON TDMA INROUTE CHANNELS

TECHNICAL FIELD

The present disclosure relates generally to broadband networks. More particularly, some embodiments of the present disclosure are directed toward systems and methods for load balancing in and across Time Division Multiple Access (TDMA) channels while accommodating Committed Information Rate (CIR) service guarantees.

BACKGROUND

Modern satellite communication systems provide a pervasive and reliable infrastructure to distribute voice, data, and video signals for global exchange and broadcast of information. These satellite communication systems have emerged as a viable option to terrestrial communication systems. Users in a shared access broadband network may be spread over a large geographical area and they may access the shared bandwidth from an access point (e.g., terminal) to an aggregation point, such as a network gateway. An operator on that shared access broadband network may provide, for example, internet services to one or more groups of users that subscribe to bandwidth from the operator. Such a group of terminals may, for example, be an enterprise with terminals in multiple geographical locations, or a virtual network operator (VNO) that provides internet services to users in a large geographic area.

Consider, for example, a digital video broadcast satellite network such as a DVBS-2 based geosynchronous earth orbit satellite network. DVB-S2 is a digital television broadcast standard developed by the DVB project (an industry consortium), and ratified by the European Telecommunications Standards Institute (ETSI) envisioned for broadcasting services, interactive services including Internet access, and data content distribution. Signals transmitted on the forward channel may be based on the DVB-S2 standard, while signals transmitted on the return channel may be based on the Internet Protocol over Satellite (IPoS) standard. In such a network, the IP layer and link gateway may be referred to as the IP gateway (IPGW) and the satellite gateway (SGW), respectively. The data stream may be broadcast to remote network nodes such as Very Small Aperture Terminals (VSATs). In the return direction on a satellite network, multiple VSATs may share one inroute with a certain amount of bandwidth when transmitting data. A bandwidth allocation module can manage and allocate bandwidth on the return channel.

SUMMARY

Systems and methods are provided in various embodiments for load balancing on time division multiple access (TDMA) channels. In accordance with one embodiment of the technology disclosed herein, a method of load balancing comprises determining available bandwidth capacity of each channel in a network, and determining bandwidth requirements of a terminal seeking admission to the network. The method further comprises determining all channels in the network that are capable of admitting the terminal based on their respective bandwidth capacity and the bandwidth requirements of the terminal. Further still, the method comprises selecting the channel capable of admitting the terminal and having the least available bandwidth capacity, and admitting the terminal to the selected channel.

In accordance with another embodiment of the technology disclosed herein, another method of load balancing comprises receiving a request for increased bandwidth demand from a terminal admitted to a first channel in a network. The method further comprises determining bandwidth capacity of each channel in the network, and determining all channels in the network that are capable of accommodating the increased bandwidth demand of the terminal based on their respective bandwidth capacity and the bandwidth requirements of the terminal including the increased bandwidth demand. Further still, the method comprises selecting a second channel in the network having the least available bandwidth capacity out of the channels determined to capable of admitting the terminal, and reassigning the terminal to the second channel.

In accordance with yet another embodiment of the technology disclosed herein, a system for load balancing comprises a shared access network, and a bandwidth allocation module configured to balance load across time division multiple access (TDMA) inroute channels in the shared access network by performing the following: determine available bandwidth capacity of each TDMA inroute channel in the shared access network; determine bandwidth requirements of a terminal; determine all TDMA inroute channels in the shared access network that are capable of admitting the terminal based on their respective bandwidth capacity and the bandwidth requirements of the terminal; select one of the TDMA inroute channels to admit the terminal based upon a sequence of determinations. The sequence of determination comprises: a determination that a TDMA inroute channel exists that is capable of supporting the bandwidth requirements of the terminal and has the least available bandwidth capacity; upon determining that no TDMA inroute channel exists that is capable of supporting the bandwidth requirements of the terminal, a determination that a TDMA inroute channel exists that is capable of supporting a guaranteed minimum aspect of the bandwidth requirements of the terminal and has the most available bandwidth capacity to support growth towards the greatest portion of a guaranteed committed information rate (CIR) aspect of the bandwidth requirements of the terminal.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As noted above, VSAT systems allow commercial users to access one of a generally limited number of satellite return channels to support two-way communication. The choice of a return or inbound channel is usually restricted to only a group of a few of the possible channels preconfigured by a combination of hardware and/or software limitations. Some commercial systems may use a VSAT system terminal for Internet access to receive HTTP responses via the outbound satellite broadcast channel, and may send HTTP requests to the Internet through a VSAT inbound channel.

The spectrum of one satellite beam can be segmented into a plurality of inroutes. For example, the frequency spectrum of a satellite beam can be split into a number of inroutes with symbol rates of, for example, 512 ksps, 1 Msps, 2 Msps, 4 Msps, etc. Inroutes within a certain geographical area that share these spectrum resources can be handled hierarchically. A grouping of inroutes that are at the same symbol rate and handled as a common pool can be referred to as an inroute group (IG). IGs of multiple symbol rates can also be handled as a common pool or set. The entire shared spectrum of a given satellite spot beam may be split into several such common sets. An IG manager (IGM) can manage bandwidth for a common set of multiple IGs. Depending on the digital modulation scheme that is utilized (e.g., quadrature phase shift keying (QPSK)), the number of symbols used to communication can vary, and as such, the symbol rate can also vary.

Slotted-time approaches for the uplink channels are commonly used and may be based on Time-Division Multiple Access (TDMA). TDMA is a technique for allocating multiple channels on the same frequency in a wireless transmission system, such as a satellite communication system. TDMA allows a number of users to access a single radio frequency (RF) channel without interference by allocating unique time slots to each user within each channel. Access is controlled using a frame-based approach, and precise system timing allows multiple users access to the bandwidth (i.e. time slot access) necessary to transmit information in a multiplexed fashion on the return channel.

Transmissions are grouped into frames, with a frame synchronization ("sync") signal usually being provided at the beginning of each frame. Following the frame sync, there are a number of time "slices" within the frame for burst transmissions. In the simplest case, one time slice representing a fixed amount of bandwidth is allocated to each of the users having the need to transmit information. Each TDMA user gets a specific time slot (or slots) in the channel, and that time slot is fixed for the user during the transmission. In more complicated systems, multiple time slices are made available to users based on transmission need or a prioritization scheme. After all time slices have elapsed, another frame synchronization signal is transmitted to restart the cycle.

TDMA relies on a method for timing of the epochs of burst transmission to reduce burst overlap and consequent "collisions" of different users' transmissions. In addition, providing each remote user access to needed uplink bandwidth (essentially equivalent to slot access) becomes more difficult when sharing a larger number of different inroute or uplink channels among a large number of users. With TDMA, each VSAT accesses a control node via the satellite by the bursting of digital information onto its assigned RF carrier. Each VSAT bursts at its assigned time relative to the other VSATs on the network. Dividing access in this way—by time slots—allows VSATs to make efficient use of the available satellite bandwidth.

Additionally, operators or service providers can provide differentiated services to users via service plans. Each service plan may be defined with a minimum committed information rate (CIR). CIR is mechanism that a service provider may use to guarantee a user a particular amount of bandwidth despite a shared bandwidth pool. CIR can be provided on a subscription basis, where a greater CIR can be associated with a more expensive subscription plan. In particular, CIR can be utilized to provide a committed information service that is defined by a guaranteed bandwidth allocation or portion. The service plan may also allow transmission up to a Maximum Information Rate (MIR) if bandwidth is available, although the allocation of bandwidth falling between CIR and MIR limits or thresholds is not necessarily guaranteed Like most TDM-based protocols, bandwidth is available to the VSAT in fixed increments whether or not it is needed. Establishing an equitable allocation of uplink bandwidth for each of the uplink or inroute users is difficult due to uneven (i.e. fluctuating heavy or light) loading within a group of uplink channels, and due to relatively uneven loading between groups of uplink channels. An individual terminal can transmit on only one channel at any given time division. That is, all assigned bandwidth for a terminal within a time division must be allocated within the context of a single TDMA channel. Without a proper load balancing scheme for committed information services, assignment of TDMA channels for committed information services may result in fragmentation of capacity. This fragmentation of capacity prevents the admission of a new session or prevents servicing any increased demand of an existing session due to insufficient available bandwidth on any of the individual channels, even though there may be sufficient "aggregate" bandwidth when summed across multiple channels to satisfy the demand. Thus, conventional systems that merely rely on a user's initial bandwidth demands are incapable of adapting to scenarios where users' bandwidth demand grow or otherwise change.

Accordingly, various embodiments are directed to systems and methods that consider guaranteed bandwidth (including CIR as well as other considerations, e.g., minimum bandwidth requirements to accommodate, for example, some predetermined quality of service (QoS)), when selecting an optimal TDMA inroute channel for admission of a terminal. Doing so can ensure that a communications session is able to "grow up" to a guaranteed bandwidth (indicated by CIR) while remaining on the same TDMA channel even though the session may have less demand than the CIR at the time of admission. Thus, an optimal TDMA channel can be one that has the least remaining capacity across all channels but still can completely accommodate the obliged guaranteed bandwidth of the new session.

Therefore, "smart" admission of a terminal to a channel can be accomplished by filling the capacity of a TDMA channel as close to full capacity as possible before allocating a new TDMA channel for committed information services in order to minimize fragmentation of capacity. For example, and in a network where there are users with different CIR bandwidth subscriptions, one or more algorithms can balance the admission of users such that on a particular TDMA channel, admission of users having different subscription, CIR is preferred.

Moreover, various embodiments provide the ability to move or shift users or terminals between TDMA channels to accommodate terminals associated with a large CIR during times of oversubscription. This shifting of terminals or sessions can occur whether terminals have already been assigned to a particular TDMA channel or when a terminal is seeking admission to a TDMA channel. Thus, load balancing of committed information service sessions can be achieved under varying circumstances.

Figure 1:
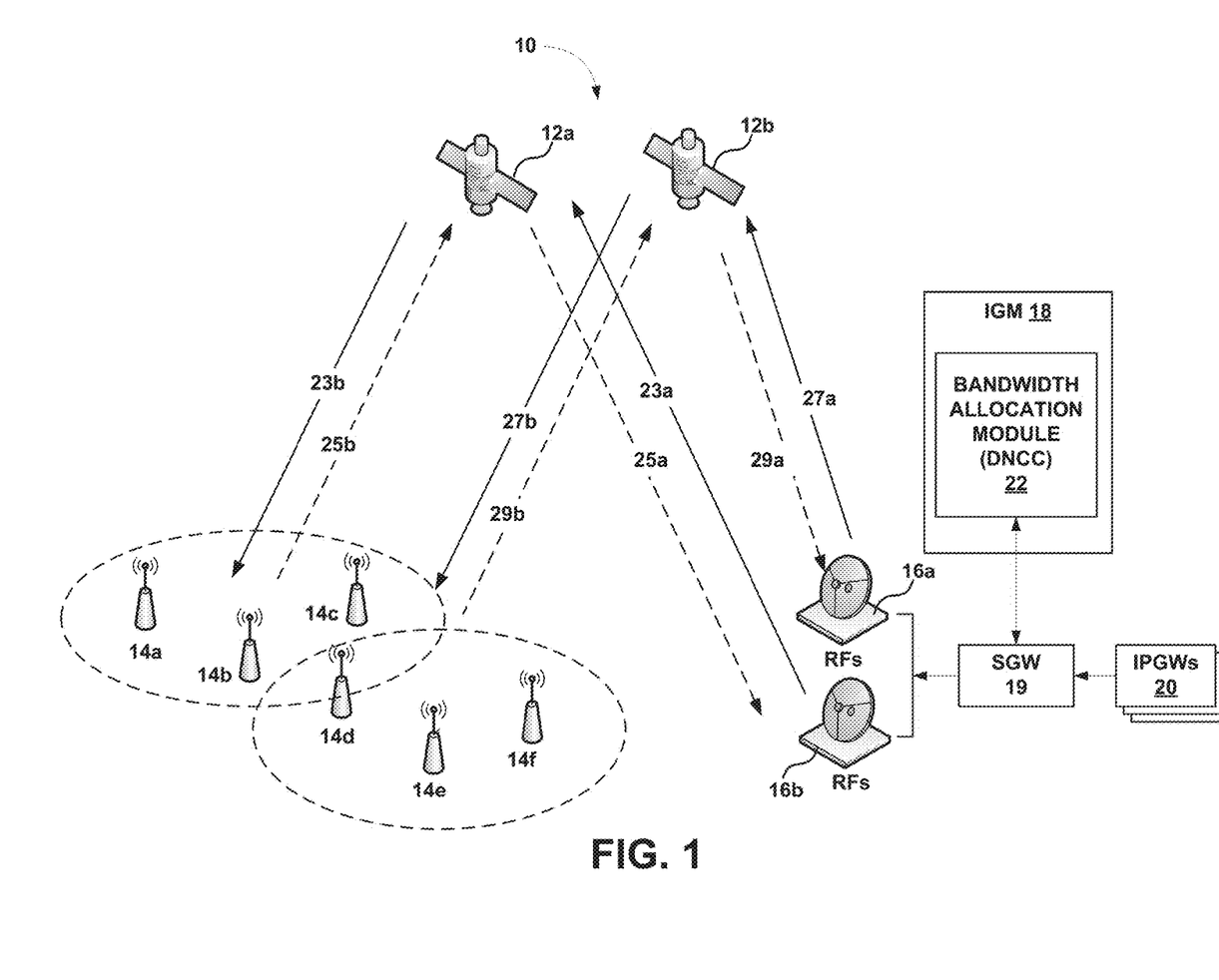
FIG. 1 illustrates an example multi-satellite data transmission system in which various embodiments can be implemented.

FIG. 1 illustrates an example satellite network 10 in which various embodiments of the technology disclosed herein may be implemented. Satellite network 100 in this example can include multiple satellites 12a and 12b, remote terminals 14a-14f, radio frequency (RF) terminals 16a and 16b, SGW 19, IPGWs 20, and a dynamic network control cluster (DNCC) or bandwidth allocation module 22 that may be implemented as or within an IGM 18. The satellite network may be a shared access broadband network. Other types of shared access networks may include, for example, wireless networks such as 4$^{th}$ Generation Long Term Evolution (4G LTE) and WiMAX networks, which may include terminals other than VSATs, such as cellular and WiFi equipped devices.

Feeder links may carry data between RF terminals 16a and 16b and satellites 12a and 12b, and may include: forward uplinks 23a and 27a for transmitting data from RF terminals 16a and 16b to satellites 12a and 12b, respectively; and return downlinks 25a and 29a for transmitting data from satellites 12a and 12b, respectively, to RF terminals 16a and 16b. User links may carry data between satellites 12a and 12b and remote terminals 14a-14f, and may include: return uplinks 25b and 29b for transmitting data from remote terminals 14a-14f to satellites 12a and 12b, respectively; and forward downlinks 23b and 27b for transmitting data from satellites 12a and 12b, respectively, to remote terminals 14a-14f. Forward uplinks 23a, 27a and forward downlinks 23b, 27b may form an outroute, and return uplinks 25b, 29b and return downlinks 25a, 29a may form an inroute. SGW 19 may include high capacity earth stations with connectivity to ground telecommunications infrastructure. SGW 19 may be communicatively connected to RF terminals 16a and 16b. RF terminals 16a and 16b may be the physical equipment responsible for sending and receiving signals to and from satellites 12a and 12b, respectively, and may provide air interfaces for SGW 19/IPGWs 20.

Satellites 12a and 12b may be any suitable communications satellites. For example, satellites 12a and 12b may be bent-pipe design geostationary satellites, which can accommodate innovations and variations in transmission parameters, operating in the Ka-band. Satellites 12a and 12b may use spot beams as well as frequency and polarization reuse to maximize the total capacity of satellite network 10. Signals passing through satellites 12a and/or 12b in the forward direction may be based on the DVB-S2 standard (ETSI EN 302 307) using signal constellations up to and including at least 16-APSK. The signals intended to pass through satellites 12a and 12b in the return direction (toward terminals 14a-14f) may be based on the Internet Protocol over Satellite (IPoS) standard (ETSI TS 102 354). Other suitable signal types may also be used in either direction, including, for example higher data rate variations of DVB-S2.

IPGWs 20 may be an ingress portion of a local network. IP traffic, including TCP traffic, from the internet may enter an SGW 19 through IPGWs 20. IPGWs 20 may each include a spoofer, which may acknowledge IP traffic, including TCP traffic sent to SGW 19. Moreover, SGW 19 may be connected to an internet through IPGWs 20. IP traffic, including TCP traffic, from the internet may enter SGW 19 through IPGWs 20. As illustrated in FIG. 1, multiple IPGWs may be connected to IGM 18. The bandwidth of RF terminals 16a and 16b can be shared amongst IPGWs 20. At each of IPGWs 20, real-time (RT) and NRT traffic flows may be classified into different priorities. These traffic flows may be processed and multiplexed before being forwarded to priority queues at SGW 19. RT traffic may go directly to an RT priority queue or SGW 19, while NRT traffic flows may be serviced based on the respective priority and volume. Data may be further packed into DVB-S2 code blocks and stored in a code block buffer before transmission.

Data from an internet intended for remote terminals 14a-14f (e.g., VSATs) may be in the form of IP packets, including TCP packets and UDP packets, or any other suitable IP packets, and may enter SGW 19 at any one of IPGWs 20, where the respective spoofer may send an acknowledgment back to the sender of the IP packets. The IP packets may be processed and multiplexed by SGW 19 along with IP packets from other IPGWs, where the IPGWs may or may not have the same service capabilities and relative priorities. The IP packets may then be transmitted to satellites 12a and 12b on forward uplinks 23a and 27a using the air interfaces provided by RF terminals 16a and 16b. Satellites 12a and 12b may then transmit the IP packets to the VSATs using forward downlinks 23b and 27b. Similarly, IP packets may enter the network via the VSATs, be processed by the VSATs, and transmitted to satellites 12a and 12b on return uplinks 25b and 29b. Satellites 12a and 12b may then send these inroute IP packets to the SGW 19/IPGWs 20 using return downlinks 25a and 29a.

Each of remote terminals 14a-14f can be, for example, VSATs and may connect to the Internet through satellites 12a and 12b and IPGWs 20/SGW 19. For example, remote terminal 14a may be used at a residence or place of business to provide a user with access to the Internet, such as modem. VSATs or Mobile Satellite Terminals (MSTs), may be used by end users to access the satellite network, and may include a remote satellite dish for receiving RF signals from and transmitting RF signals to satellite 12a, as well as a satellite modem and other equipment for managing the sending and receiving of data. They may also include one or more remote hosts, which may be computer systems or other electronic devices capable of network communications at a site.

One or more IGMs can be implemented one of which is illustrated as IGM 18). An IGM may be a bandwidth controller running bandwidth allocation algorithms. The IGM may assign bandwidth to the remote terminals 14a-14f in the form of inroute and IGs, based in part on bandwidth demand requests from the remote terminals 14a-14f.

In various embodiments, load balancing on the inroute can be performed by a bandwidth allocation module 22 (such as a dynamic network control cluster (DNCC)), which can support dynamic bandwidth allocation for return channels. In particular, and as described in greater detail below, bandwidth allocation module 22 may utilize: (1) smart admission mechanisms for admitting terminals/committed information service sessions to a TDMA inroute channel; and/or (2) remote terminal shifting from one inroute channel to another to make room for growing bandwidth demand of an existing/already-admitted remote terminal or to accommodate another remote terminal seeking admission to the one inroute channel. It should be noted that the DNCC/bandwidth allocation module 22 can always keep track of available and reserved bandwidth as well as available and un-allocated bandwidth on an inroute channel. Available, reserved bandwidth or space on an inroute channel can be considered available after accounting for all admitted terminals CIR bandwidth requirements, and available, un-allocated bandwidth or space on an inroute channel can be indicative of bandwidth actually available on the inroute channel.

Committed information service sessions may be established and terminated asynchronously. Even with the mechanism(s) proposed above to minimize channel fragmentation, situations may arise when a TDMA channel is unable to accommodate a session's obliged bandwidth or actual demand (either related to admission of a new session or increased demand of an existing session). This can be true even though there may be sufficient aggregate bandwidth across the sum of all TDMA channels to support the demand and/or CIR. In this case, the following progression of operations can be performed for the assignment of new terminals or sessions.

First, a TDMA channel can be selected that meets the CIR bandwidth of a terminal/session. Second, and in the event that the guaranteed CIR bandwidth cannot be met, a TDMA channel can be selected that meets a current (terminal/session) demand and provides the opportunity to serve a maximum percentage of the CIR a service provider is obligated to provide. Third, and if the TDMA channel is unable to satisfy the current demand, existing sessions can be reassigned to other TDMA channels to create bandwidth space to admit the new session. It should be noted that this act(s) of reassignment considers the ability of a TDMA channel to meet the CIR for any reassigned sessions so that existing sessions can be appropriately served.

For the assignment of bandwidth to an existing session to meet, e.g., increased demand up to some bandwidth, i.e., the CIR, the following progression of operations can be performed. First, the session requesting increased bandwidth can be reassigned to another TDMA channel which can accommodate the guaranteed bandwidth requirements of the session. Again, this is predicated upon not a current TDMA inroute channel not being able to accommodate the increased bandwidth. Second, if a TDMA channel that meets the guaranteed bandwidth requirements cannot be found, the session requesting the increased bandwidth can be reassigned to another TDMA channel that meets the current bandwidth demand and provides the opportunity to serve a maximum percentage (but still less that the entirety) of the guaranteed bandwidth (per the session's CIR). Third, and if the current demand still cannot be accommodated, existing sessions can be reassigned to other TDMA channels to create bandwidth space to accommodate the demand increase for the session, although reassignment still retains the ability to meet the CIR for the re-assigned sessions. It should be noted that the reassignment of committed information service sessions to different TDMA channels is performed such that reassignment occurs seamlessly without any interruption in service and without any increase in latency and jitter.

As alluded to above, committed information services are designed to provide bandwidth allocation guarantees for remote terminals, where this type of service can have two bandwidth components, a guaranteed bandwidth portion, i.e., the CIR, and a non-guaranteed bandwidth portion referred to as the MR. Moreover, committed information services can be associated with another aspect of guaranteed bandwidth, e.g., a minimum bandwidth requirement that can correspond to the type of communications that a remote terminal will engage in and some QoS, for example.

In accordance with various embodiments, the minimum bandwidth requirement can be used as a baseline for admission to a channel. It should be noted that the minimum bandwidth requirement encompasses a current bandwidth demand at the time of admission. That is, admission to a TDMA inroute channel can first consider the QoS of a committed information service session to determine if a particular TDMA inroute channel can support the bandwidth requirements for the particular QoS required. Additionally, the CIR can be considered, where the amount of guaranteed bandwidth per the committed information service session's CIR can be reserved on a particular TDMA inroute channel. Further still, any bandwidth needs between the CIR and the MIR can be considered so long as there is bandwidth available beyond the CIR and up to the MIR on a TDMA inroute channel.

Figure 2:
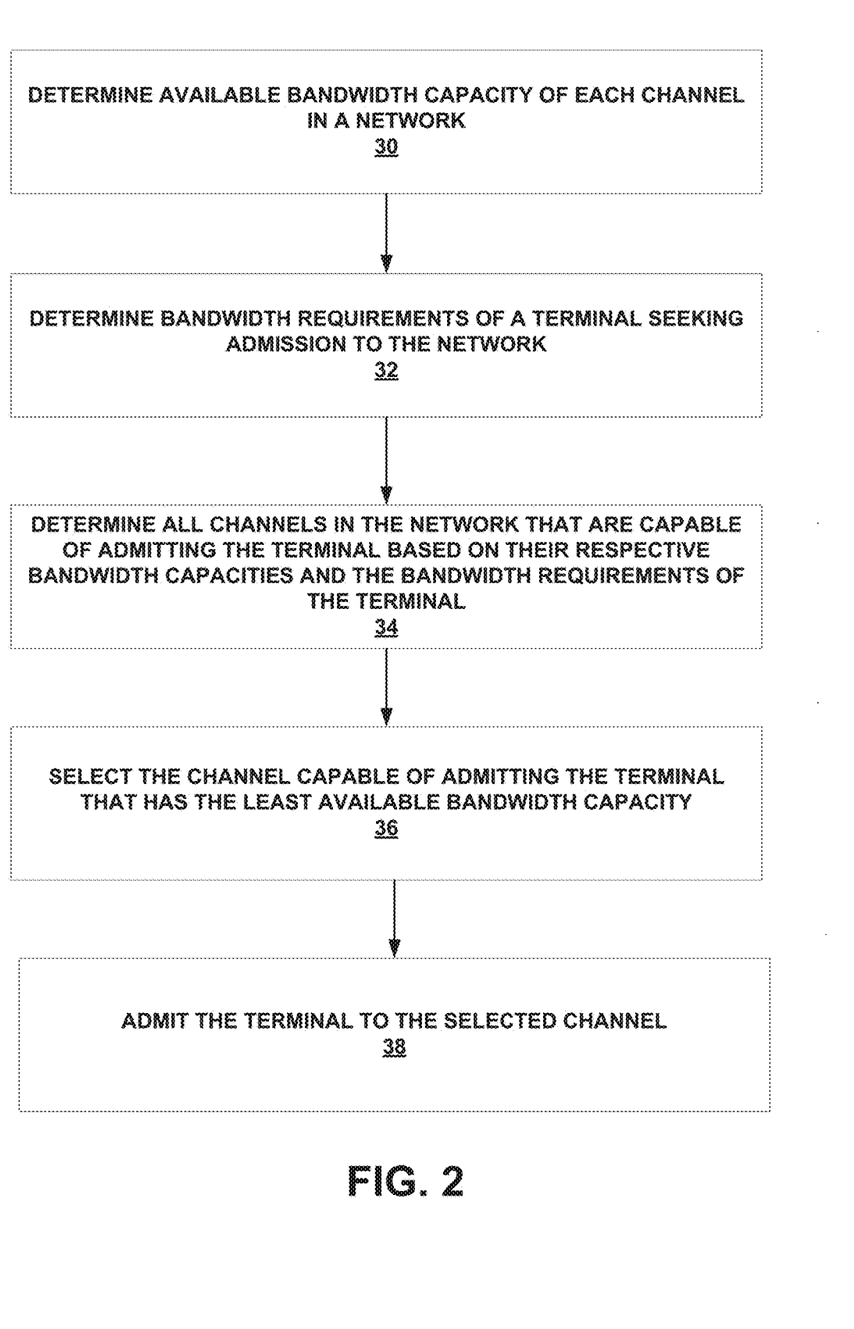
FIG. 2 is an operational flow chart illustrating example processes performed by a bandwidth allocation module for performing load balancing in accordance with one embodiment.

FIG. 2 illustrates example operations performed for achieving load balancing in accordance with various embodiments. At operation 30, the available bandwidth capacity of each channel in a network, e.g., each TDMA inroute channel of a satellite network, can be determined (availability having been previously described in accordance with the concept of available, reserved and available, un-allocated bandwidth). It should be noted that in this case, available bandwidth capacity can refer to a channel's remaining capacity after any obliged bandwidth is reserved to support admitted terminals' CIR requirements. At operation 32, the bandwidth requirements of a terminal seeking admission to the network is determined. It should be noted that the bandwidth requirements of the terminal can be considered to be the terminal's CIR bandwidth requirements, where the terminal's current bandwidth demand may be less that the CIR bandwidth requirements. At operation 34, all channels in a network that are capable of admitting the terminal based on their respective bandwidth capacities and the bandwidth requirements of the terminal are determined. At operation 36, the channel capable of admitting the terminal that has the least available bandwidth capacity is selected. At operation 38, the terminal is admitted to the selected channel.

Therefore, admission of committed information service sessions takes into consideration, any bandwidth a service provider is obliged to provide, which is the guaranteed bandwidth component (CIR) of the committed information service of a new user to be admitted and also that of already admitted users on a TDMA inroute channel. Also taken into account is the avoidance of capacity fragmentation by striving to ensure that large portions or chunks of bandwidth are available on other inroute channels rather than conventional "fair" distribution of load across all inroutes so that large-demand users can grow without necessitating shifts of such large-demand users to another TDMA channel. Further still, various embodiments seek to mix committed information sessions having large CIR bandwidth requirements with small CIR bandwidth committed information sessions on one TDMA inroute channel.

Figure 3:
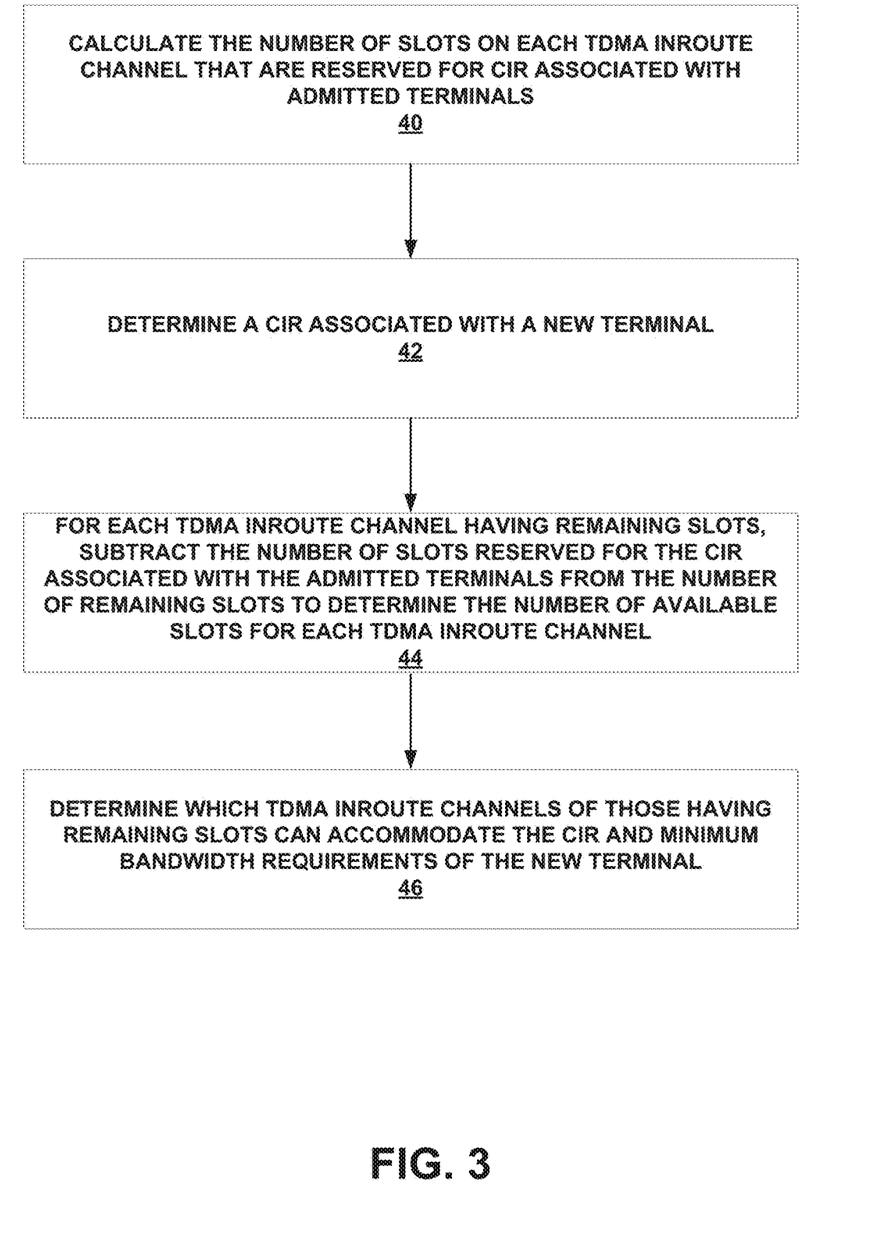
FIG. 3 is an operational flow chart illustrating example processes performed by a bandwidth allocation module for performing load balancing in accordance with another embodiment.

FIG. 3 illustrates a more detailed flow of example operations for achieving load balancing through smart admission. By way of example, a TDMA inroute channel may comprise 45 ms frames, each frame having a specific number of slots based on the symbol rate of the channel. Each slot may carry 120 symbols irrespective of symbol rates of channels. When a new user or remote terminal with a committed information service session is requesting to become active in a network, the bandwidth allocation module (e.g., bandwidth allocation module 22 of FIG. 1) can perform the flowing operations. At operation 40, the number of slots on each TDMA inroute channel that are reserved for CIR associated with admitted terminals are calculated. Thus, any remaining slots are available for accommodating admission of the new terminal. At operation 42, at least a minimum bandwidth requirement and a CIR associated with the new terminal are determined. At operation 44, for each TDMA inroute channel having remaining slots, the number of slots reserved for the CIR associated with the admitted terminals are subtracted from the number of remaining slots to determine the number of available slots for each TDMA inroute channel. That is, bandwidth allocation module 22 can determine all the TDMA inroute channels that have remaining slots that can accommodate the guaranteed bandwidth of the new terminal. At operation 46, the TDMA inroute channels of those having remaining slots that can accommodate the CIR and the minimum bandwidth requirements of the new terminal are determined.

To the above, selecting the "best" or "optimal" TDMA inroute channel among those having available bandwidth can be performed by determining which of the TDMA inroute channels having remaining and available slots also has the least number of obligated remaining slots (i.e., the least bandwidth capacity that can still accommodate the minimum and CIR bandwidth requirements of the new terminal). In other words, and as described above, various embodiments seek a "best fit" method by trying to admit new terminals in such a manner that TDMA inroute channels having capacity are filled as close to capacity as possible before considering admission to another TDMA inroute channel. This advantageously leaves larger portions of other TDMA inroute channels available for new terminals having larger bandwidth requirements.

If no such "best fit" TDMA inroute channel is found, or if there is no TDMA inroute channel that can accommodate the guaranteed CIR bandwidth for the new terminal, the bandwidth allocation module can select a channel which has the most number of available remaining slots beyond what are reserved (for CIR requirements) to already admitted terminals but still can accommodate an initial demand of the new user (i.e., that which has the most available, unallocated bandwidth), which can be referred to as a "least fit" method. This ensures that the new session will be able to grow to the greatest percentage of its guaranteed CIR bandwidth. However, in such a scenario, a session may not be able to grow to its full guaranteed CIR bandwidth demand.

If an appropriate TDMA inroute channel still cannot be found, the bandwidth allocation module 22 can attempt to reassign existing sessions to different TDMA inroute channels in order to make room for at least the current demand of the new terminal. However, any reassigned sessions will still have their CIR bandwidth requirements met at any TDMA inroute channel to which they are reassigned.

Figure 4:
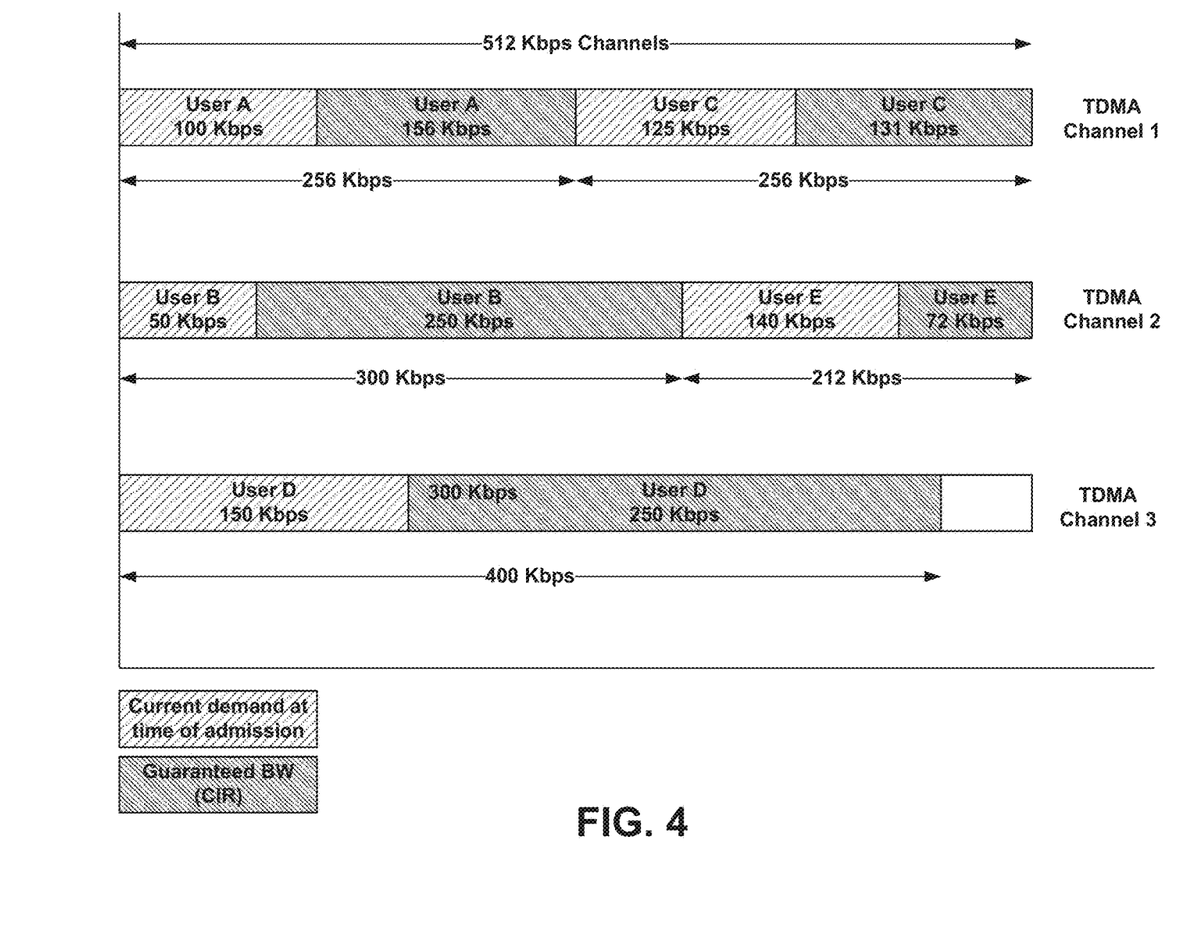
FIG. 4 is a diagrammatic representation of an example admission scenario in accordance with various embodiments.

FIG. 4 illustrates an example of the above-described admission scheme. In this example, there are three 512 Kbps TDMA inroute channels of a network and five users (Users A, B, C, D, and E) in the network. Users A, B, C, D, and E can attempt admission to the network sequentially. The guaranteed bandwidth subscriptions (CIR bandwidths) associated with Users A, B, C, D, and E are as follows: User A has a 256 Kbps guaranteed bandwidth; User B has 300 Kbps guaranteed bandwidth; User C has 256 Kbps guaranteed bandwidth; User D has 400 Kbps guaranteed bandwidth; and User E has 350 Kbps guaranteed bandwidth.

Admission to the TDMA inroute channels on the network utilizing the aforementioned smart admission scheme is achieved as follows. User A is admitted into TDMA channel 1, where User A has a current bandwidth requirement of 100 Kbps and has 156 Kbps reserved for its CIR bandwidth guarantee. User B with a guaranteed bandwidth demand of 300 Kbps (50 Kbps current and 250 Kbps reserved for CIR) is admitted into TDMA channel 2. User B cannot be admitted to TDMA channel 1 because its minimum and CIR bandwidth requirements exceed the available bandwidth of TDMA channel 1. User C is added into TDMA channel 1 as TDMA channel 1 (currently) has the least amount of available bandwidth left but still can accommodate bandwidth requirements up to the CIR of User C (125 Kbps current and 131 Kbps CIR bandwidth). TDMA channel 2 cannot accommodate the guaranteed bandwidth of User C. User C could have been added into TDMA channel 3. However, as described above, User C is admitted into TDMA channel 1 in accordance with various embodiments so as to keep as large a portion of bandwidth available as possible on TDMA channel 3. This allows User D which has a guaranteed bandwidth requirement of 400 Kbps (150 Kbps current and 250 Kbps CIR bandwidth reserved) to be admitted to TDMA channel 3. If User C would have been admitted to TDMA channel 3, User D could have been admitted to any of the three channels based on its current bandwidth requirement, but would not have been able to grow a committed information service session to its full CIR bandwidth subscription. User E has a guaranteed bandwidth requirement of 350 Kbps (140 Kbps current and 210 Kbps CIR bandwidth). However, no TDMA inroute channel has the available bandwidth to allow 210 Kbps to be reserved. The available bandwidth TDMA channel 1 is 0 Kbps, the available bandwidth on TDMA channel 2 is 212 Kbps, and the available bandwidth on TDMA channel 3 is 112 Kbps) without disrupting the other users' reserved bandwidth. Because TDMA channel 2 has the most available bandwidth left, User E is admitted to TDMA channel 2 as it provides the greatest amount of growth possibilities for the CIR bandwidth requirements of User E.

During periods of congestion or oversubscription, an inroute channel (where a user was originally admitted) may not be able to accommodate the increased demand for that user. Accordingly, various embodiments allow for a user requesting increased bandwidth support can be reassigned to another inroute channel which can accommodate this increased demand. Alternatively, other users receiving bandwidth on the same inroute channel of the requesting user can be moved to a different channel(s) to make bandwidth available for the requesting user on its current inroute channel.

In particular, and when the growth demand of an existing committed information service session cannot be satisfied in a current inroute channel, bandwidth allocation module 22 (of FIG. 2) will attempt to move a user to another/alternative inroute channel which can accommodate the total guaranteed bandwidth of that user. The method utilized to achieve this shift in inroute channel is similar to that described above for admission of a new terminal, but again, performed in the context of an existing (already admitted terminal) seeking increased bandwidth support. As described above, the number of slots on each inroute channel of a network that are obliged/reserved for users based on their respective guaranteed bandwidth requirements. The remaining slots on each of the inroute channels can be considered available to accept the user shifting from a current inroute channel. The inroute channel that has the least amount of remaining slots (the remaining slots available after deducting the slots allocated to and/or reserved for the guaranteed bandwidth of other users) but can still accommodate the guaranteed bandwidth requirements of the user can be selected. This can be considered the best fit method. However, if no appropriate inroute channel can be found that is capable of accommodating the guaranteed bandwidth of the user, the inroute channel which has greatest number of available remaining slots and can accommodate at least the current demand (including the delta demand, i.e., that amount of increased bandwidth that the user is requesting) of the user is selected. This can be referred to as the least fit method.

In the event that an appropriate inroute channel still cannot be found, the bandwidth allocation module 22 can consider moving one or more other users currently receiving bandwidth on the same inroute channel in which the user is requesting increased demand to another inroute channel(s). In particular, the selection of user(s) to be moved can be random and need not follow any precedence or other default or set criteria. That is, an attempt can be made to shift one user to an alternative inroute channel, and if that is not possible (based on the this user's guaranteed bandwidth requirements), an attempt can be made to shift multiple users to one or more alternative inroute channels capable of supporting the guaranteed bandwidth requirements of these to-be-shifted users.

To determine which of the alternative inroute channels one or more users can be shifted to, the number of slots on each inroute channel which have bandwidth reserved for guaranteed bandwidth users is determined. Again, the remaining slots are available to accept the shifting user(s). The inroute channel(s) which have the least amount of remaining slots (the remaining slots available after deducting the number of slot being currently used and/or reserved) but can still accommodate the guaranteed CIR bandwidth of the one or more users can be selected as the inroute channel(s) to which the one or more users can be shifted. If no appropriate inroute channel(s) can accommodate the guaranteed bandwidth for the user(s), the increased demand of the current user cannot be satisfied. If the requesting user cannot be moved and other users cannot be moved, the increased bandwidth demand from this user is denied.

Figure 5A:
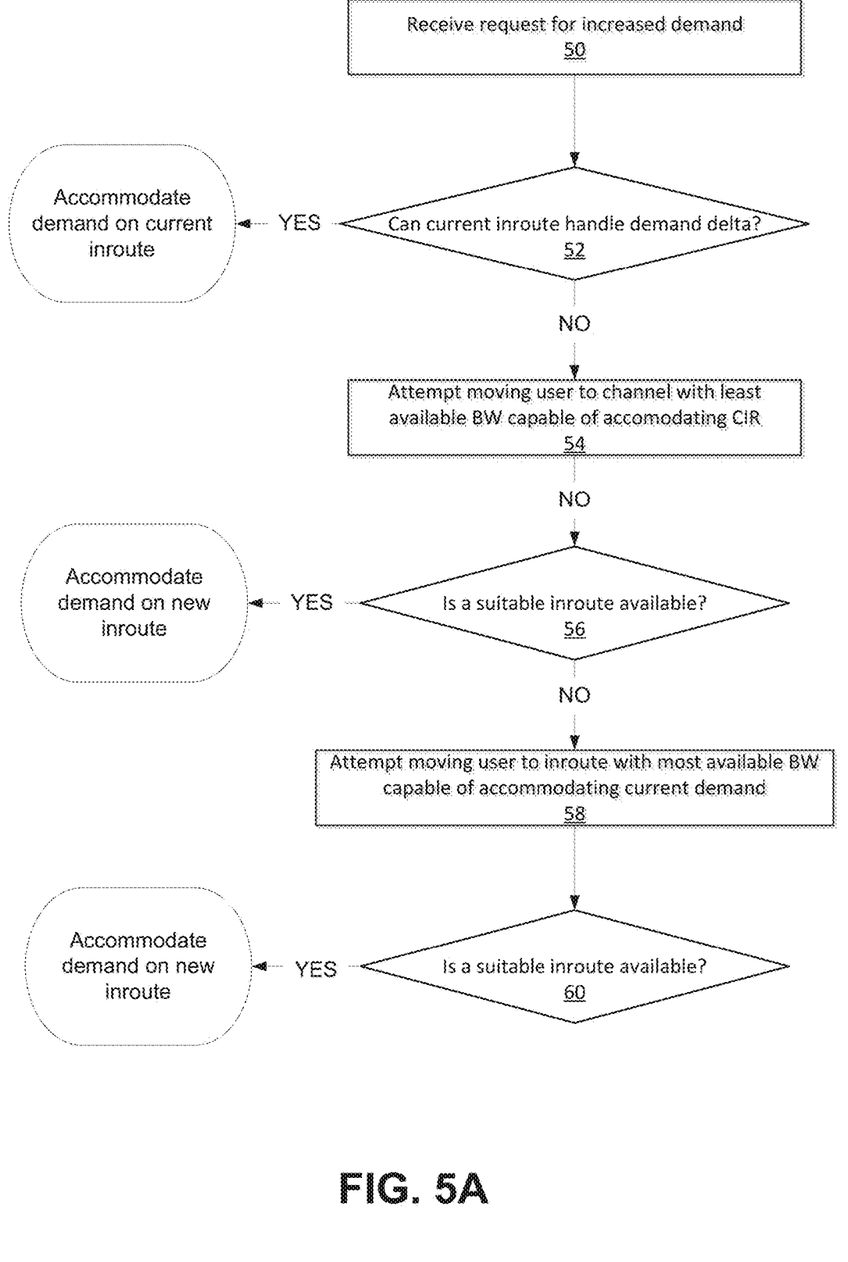
FIGS. 5A and 5B are operational flow charts illustrating example processes performed for terminal shifting to balance load in accordance with various embodiments.
Figure 5B:
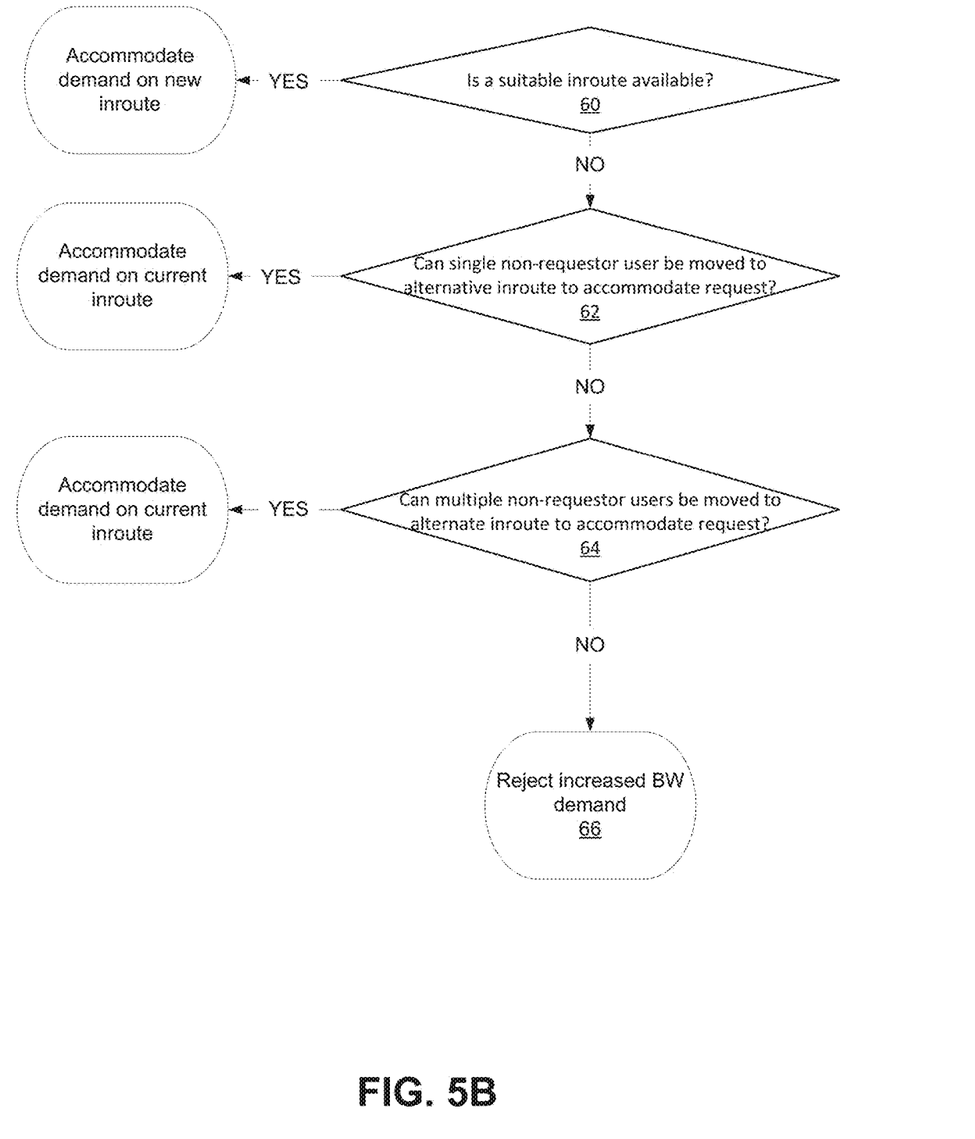

FIGS. 5A and 5B illustrate example logical processes for growth accommodation that include shifting terminals to achieve load balancing in accordance with various embodiments. Increased guaranteed bandwidth demand from users can be satisfied even if a current inroute channel may not have enough bandwidth to accommodate the request. At operation 50, a request for increased demand may be received from an existing terminal in a network. It is determined at operation 52 (e.g., by the bandwidth allocation module 22 of FIG. 2) whether the current inroute channel can handle this increased demand (delta demand). If so, the current inroute channel can continue to support the user. If not, the bandwidth allocation module 22 can attempt to move the user requesting the increase in bandwidth to an alternative inroute channel having the least amount of available bandwidth capacity to accommodate the CIR bandwidth at operation 54. Accordingly, a search for a suitable inroute channel can be performed at operation 56. If a suitable inroute channel can be found (as described above), the requesting user can be shifted to the alternative inroute channel. If not, the bandwidth allocation module 22 can attempt to move the user to an inroute channel having the greatest amount of available bandwidth capable of accommodating the current demand of the user at operation 58. Accordingly, a search for a suitable inroute channel can be performed at operation 60. If a suitable inroute channel is found, the user can be shifted to that inroute channel. If a suitable inroute channel still cannot be found, bandwidth allocation module 22 can attempt to move a non-requesting user in the current inroute channel to an alternative inroute channel to accommodate the increased bandwidth request of the requesting user at operation 62. If an alternative inroute channel can be found to accommodate the non-requesting user (i.e., the non-requesting users guaranteed bandwidth which can include the minimum/current and CIR bandwidth requirements), the non-requesting user to shifted to that alternative inroute channel. If the movement of a single non-requesting user to an alternative inroute channel is not sufficient to accommodate the increased bandwidth demand, the bandwidth allocation module 22 can attempt to move multiple non-requesting users to one or more alternate inroute channels at operation 64. If one or more appropriate alternate inroute channels are found, the multiple non-requesting users can be moved. If not, the increased bandwidth demand can be rejected at operation 66.

Various embodiments described herein are directed to systems and methods of load balancing in the context of various bandwidth requirements, where the fragmentation of TDMA-based inroute capacity can be prevented or at the least, minimized, when the network is providing committed information services. This fragmentation of capacity prevents admitting a new session or servicing the increased demand of an existing session because of insufficient available bandwidth on any of the individual channels although there is sufficient aggregate bandwidth when summed across all multiple channels to satisfy the demand. It should be noted that although described in satellite inroute channel context, various embodiments are contemplated for use and implementation in any type of system or network utilizing TDM. Additionally, although various embodiments have been described in terms of end user remote terminal such as user modems, various embodiments contemplate applicability to other types of terminals having, e.g., more service capacity, such as WiFi hotspots.

Figure 6:
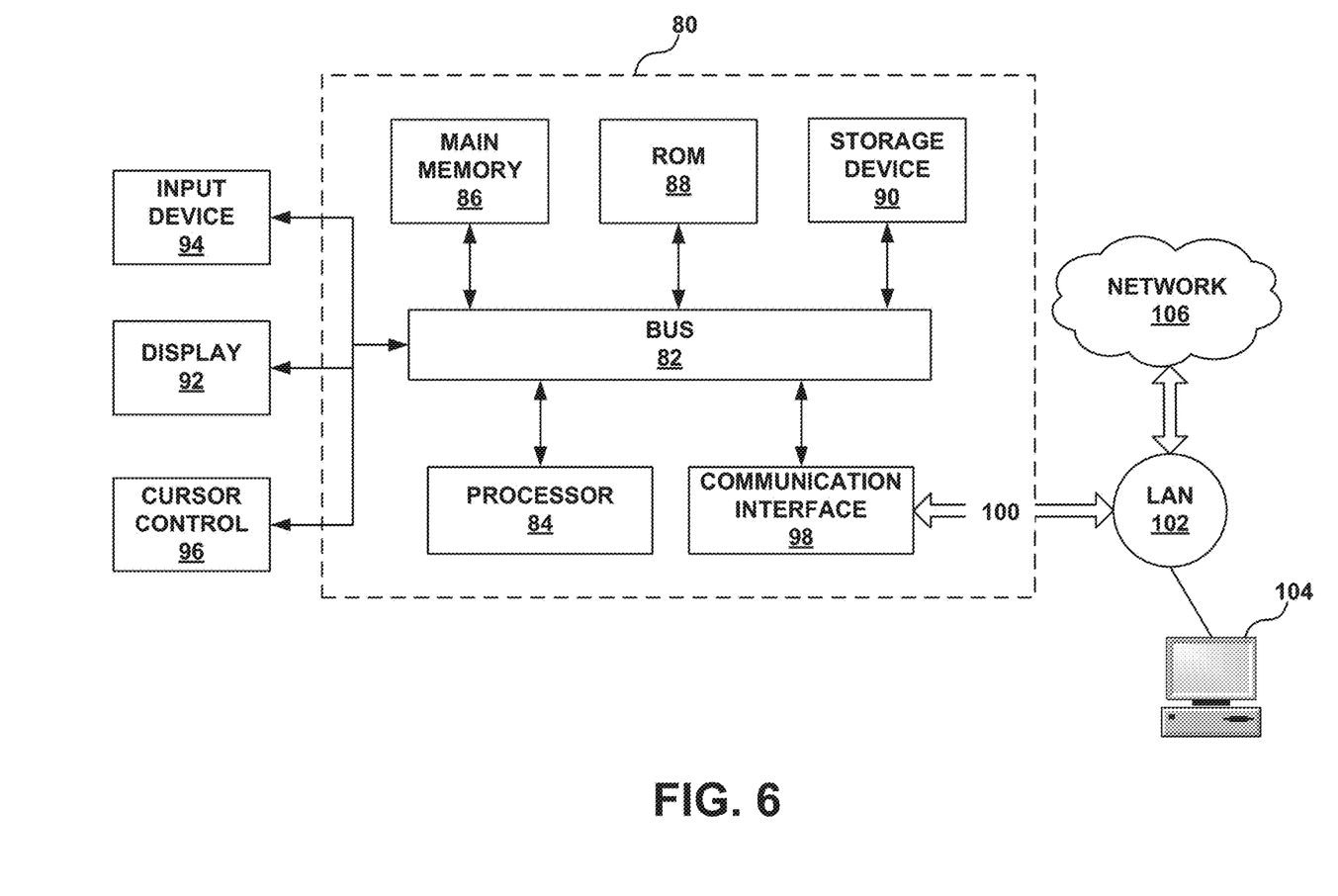
FIG. 6 illustrates an example computing module that may be used in implementing features of various embodiments.

FIG. 6 illustrates a computer system 80 upon which example embodiments according to the technology disclosed herein can be implemented. Computer system 80 can include a bus 82 or other communication mechanism for communicating information, and a processor 84 coupled to bus 82 for processing information. Computer system 80 may also include main memory 86, such as a random access memory (RAM) or other dynamic storage device, coupled to bus 82 for storing information and instructions to be executed by processor 84. Main memory 86 can also be used for storing temporary variables or other intermediate information during execution of instructions to be executed by processor 84. Computer system 80 may further include a read only memory (ROM) 88 or other static storage device coupled to bus 82 for storing static information and instructions for processor 84. A storage device 90, such as a magnetic disk or optical disk, may additionally be coupled to bus 82 for storing information and instructions.

Computer system 80 can be coupled via bus 82 to a display 92, such as a cathode ray tube (CRT), liquid crystal display (LCD), active matrix display, light emitting diode (LED)/organic LED (OLED) display, digital light processing (DLP) display, or plasma display, for displaying information to a computer user. An input device 94, such as a keyboard including alphanumeric and other keys, may be coupled to bus 82 for communicating information and command selections to processor 84. Another type of user input device is cursor control 96, such as a mouse, a trackball, or cursor direction keys for communicating direction information and command selections to processor 84 and for controlling cursor movement on display 92.

According to one embodiment, load balancing can be provided by a DNCC or bandwidth allocation/management module or element utilizing computer system 80 in response to processor 84 executing an arrangement of instructions contained in main memory 86. Such instructions can be read into main memory 86 from another computer-readable medium, such as storage device 90. Execution of the arrangement of instructions contained in main memory 86 causes processor 84 to perform one or more processes described herein. One or more processors in a multi-processing arrangement may also be employed to execute the instructions contained in main memory 86. In alternative embodiments, hard-wired circuitry is used in place of or in combination with software instructions to implement various embodiments. Thus, embodiments described in the present disclosure are not limited to any specific combination of hardware circuitry and software.

Computer system 80 may also include a communication interface 98 coupled to bus 82. Communication interface 98 can provide a two-way data communication coupling to a network link 100 connected to a local network 102. By way of example, communication interface 98 may be a digital subscriber line (DSL) card or modem, an integrated services digital network (ISDN) card, a cable modem, or a telephone modem to provide a data communication connection to a corresponding type of telephone line. As another example, communication interface 98 may be a local area network (LAN) card (e.g. for Ethernet™ or an Asynchronous Transfer Model (ATM) network) to provide a data communication connection to a compatible LAN. Wireless links can also be implemented. In any such implementation, communication interface 98 sends and receives electrical, electromagnetic, or optical signals that carry digital data streams representing various types of information. Further, communication interface 98 may include peripheral interface devices, such as a Universal Serial Bus (USB) interface, a PCMCIA (Personal Computer Memory Card International Association) interface, etc.

Network link 100 typically provides data communication through one or more networks to other data devices. By way of example, network link 100 can provide a connection through local network 102 to a host computer 104, which has connectivity to a network 106 (e.g. a wide area network (WAN) or the global packet data communication network now commonly referred to as the "Internet") or to data equipment operated by service provider. Local network 102 and network 106 may both use electrical, electromagnetic, or optical signals to convey information and instructions. The signals through the various networks and the signals on network link 100 and through communication interface 98, which communicate digital data with computer system 80, are example forms of carrier waves bearing the information and instructions.

Computer system 80 may send messages and receive data, including program code, through the network(s), network link 100, and communication interface 98. In the Internet example, a server (not shown) might transmit requested code belonging to an application program for implementing an embodiment of the present invention through network 106, local network 102 and communication interface 98. Processor 84 executes the transmitted code while being received and/or store the code in storage device 90, or other non-volatile storage for later execution. In this manner, computer system 80 obtains application code in the form of a carrier wave.

The term "computer-readable medium" as used herein refers to any medium that participates in providing instructions to processor 84 for execution. Such a medium may take many forms, including but not limited to non-volatile media, volatile media, and transmission media. Non-volatile media include, for example, optical or magnetic disks, such as storage device 90. Volatile media may include dynamic memory, such as main memory 86. Transmission media may include coaxial cables, copper wire and fiber optics, including the wires that comprise bus 82. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 7:
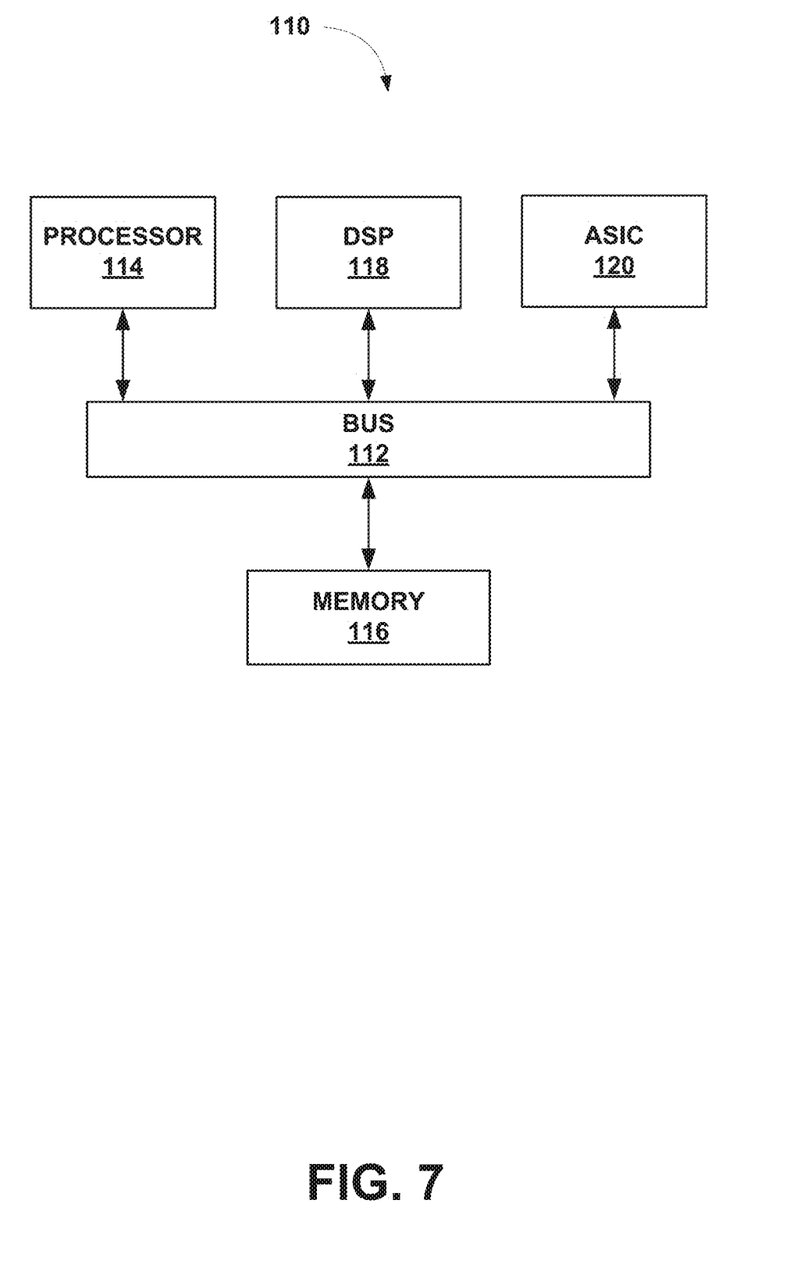
FIG. 7 illustrates an example chip set that can be utilized in implementing architectures and methods for dynamic bandwidth allocation in accordance with various embodiments.

FIG. 7 illustrates a chip set 110 in which embodiments of the technology disclosed herein may be implemented. Chip set 110 can include, for instance, processor and memory components described with respect to FIG. 6 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 110 includes a communication mechanism such as a bus 112 for passing information among the components of the chip set 110. A processor 114 has connectivity to bus 112 to execute instructions and process information stored in a memory 116. Processor 114 includes one or more processing cores with each core configured to perform independently. A multi-core processor enables multiprocessing within a single physical package. Examples of a multi-core processor include two, four, eight, or greater numbers of processing cores. Alternatively or in addition, processor 114 includes one or more microprocessors configured in tandem via bus 112 to enable independent execution of instructions, pipelining, and multithreading. Processor 114 may also be accompanied with one or more specialized components to perform certain processing functions and tasks such as one or more digital signal processors (DSP) 118, and/or one or more application-specific integrated circuits (ASIC) 1010. DSP 118 can typically be configured to process real-world signals (e.g., sound) in real time independently of processor 114. Similarly, ASIC 120 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 114 and accompanying components have connectivity to the memory 116 via bus 112. Memory 116 includes both dynamic memory (e.g., RAM) and static memory (e.g., ROM) for storing executable instructions that, when executed by processor 114, DSP 118, and/or ASIC 120, perform the process of example embodiments as described herein. Memory 116 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 80. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A method, comprising:
   determining available bandwidth capacity of each channel in a network;
   determining bandwidth requirements of a terminal seeking admission to the network;

determining all channels in the network that are capable of admitting the terminal based on their respective bandwidth capacity and the bandwidth requirements of the terminal;

selecting the channel capable of admitting the terminal and having the least available bandwidth capacity; and admitting the terminal to the selected channel.

2. The method of claim 1, wherein the network is a satellite network.

3. The method of claim 1, wherein the channels in the network are time division multiple access (TDMA) inroute channels.

4. The method of claim 1, wherein determining the bandwidth capacity of each channel in the network comprises calculating the number of slots on each of the channels that are being utilized to serve current bandwidth demands of already admitted terminals and the number of slots on each of the channels that are reserved to accommodate committed information rate (CIR) bandwidth requirements of the already admitted terminals.

5. The method of claim 4, wherein determining the bandwidth capacity of each channel in the network further comprises subtracting the number of slots on each of the channels that are being utilized to serve current bandwidth demands of the already admitted terminals and the number of slots on each of the channels that are reserved to accommodate CIR bandwidth requirements of the already admitted terminals from a total number of slots on each of the channels.

6. The method of claim 1, wherein the bandwidth requirements of the terminal comprise a minimum bandwidth requirement and a CIR bandwidth requirement.

7. The method of claim 6, wherein the selected channel comprises an alternative channel capable of supporting at least the minimum bandwidth requirement of the terminal and that has the greatest amount of available bandwidth capacity to maximize partial satisfaction of the CIR bandwidth requirement of the terminal if no channel in the network can fully satisfy the minimum bandwidth requirement, the current bandwidth requirement to satisfy a current session, and the CIR bandwidth requirement of the terminal.

8. The method of claim 7, wherein the minimum bandwidth requirement includes a current bandwidth requirement to satisfy a current session.

9. The method of claim 6, wherein the bandwidth requirements further comprises a maximum information rate (MIR) bandwidth requirement.

10. The method of claim 1, wherein admitting the terminal to the selected channel is performed pursuant to reassignment of one or more terminals already admitted to the selected channel to one or more alternative channels.

11. The method of claim 10, wherein the one or more alternative channels to which the one or more terminals are reassigned have bandwidth capacity to satisfy minimum bandwidth requirements, current bandwidth requirements, and CIR bandwidth requirements of the one or more terminals.

12. A method, comprising:

receiving a request for increased bandwidth demand from a terminal admitted to a first channel in a network;

determining bandwidth capacity of each channel in the network;

determining all channels in the network that are capable of accommodating the increased bandwidth demand from the terminal based on their respective bandwidth capacity and the bandwidth requirements of the terminal including the increased bandwidth demand;

selecting a second channel in the network having the least available bandwidth capacity out of the channels determined to be capable of accommodating the increased bandwidth demand from the terminal; and reassigning the terminal to the second channel.

13. The method of claim 12, wherein the network is a satellite network.

14. The method of claim 12, wherein the channels in the network are time division multiple access (TDMA) inroute channels.

15. The method of claim 12, wherein determining the bandwidth capacity of each channel in the network comprises calculating the number of slots on each of the channels that are being utilized to serve current bandwidth demands of already admitted terminals and the number of slots on each of the channels that are reserved to accommodate committed information rate (CIR) bandwidth requirements of the already admitted terminals.

16. The method of claim 15, wherein determining the bandwidth capacity of each channel in the network further comprises subtracting the number of slots on each of the channels that are being utilized to serve current bandwidth demands of the already admitted terminals and the number of slots on each of the channels that are reserved to accommodate CIR bandwidth requirements of the already admitted terminals from a total number of slots on each of the channels.

17. The method of claim 12, wherein the bandwidth requirements of the terminal further comprise a current bandwidth requirement to satisfy a current session and a CIR bandwidth requirement.

18. The method of claim 17, further comprising selecting a third channel upon a determination that a channel capable of fully satisfying the current bandwidth requirement, the increased bandwidth demand, and the CIR bandwidth requirement of the terminal is non-existent and that reassignment of the terminal to the second channel cannot be performed, the third channel being capable of supporting the current bandwidth requirement of the terminal, the increased bandwidth demand and that has the greatest amount of available bandwidth capacity to maximize partial satisfaction of the CIR bandwidth requirement of the terminal.

19. The method of claim 18, further comprising selecting one or more alternative terminals to reassign to one or more alternative channels upon a determination that a channel capable of supporting the current bandwidth requirement of the terminal and the increased bandwidth demand of the terminal is non-existent.

20. The method of claim 19, further comprising denying the increased bandwidth demand upon a determination that the one or more alternative terminals cannot be reassigned to the one or more alternative channels due to the one or more alternative channels being incapable of supporting the bandwidth requirements of the one or more alternative terminals.

21. A system, comprising:

a shared access network; and a bandwidth allocation module configured to balance load across time division multiple access (TDMA) inroute channels in the shared access network by performing the following:

determine available bandwidth capacity of each TDMA inroute channel in the shared access network;

determine bandwidth requirements of a terminal;

determine all TDMA inroute channels in the shared access network that are capable of admitting the terminal based on their respective bandwidth capacity and the bandwidth requirements of the terminal;

select one of the TDMA inroute channels to admit the terminal based upon a sequence of determinations comprising:

a determination that a TDMA inroute channel exists that is capable of supporting the bandwidth requirements of the terminal and has the least available bandwidth capacity;

upon determining that no TDMA inroute channel exists that is capable of supporting the entirety of the bandwidth requirements of the terminal, a determination that a TDMA inroute channel exists that is capable of supporting a guaranteed minimum aspect of the bandwidth requirements of the terminal and has the most available bandwidth capacity to support growth towards the greatest portion of a guaranteed committed information rate (CIR) aspect of the bandwidth requirements of the terminal.

22. The system of claim 21, wherein the terminal comprises a to-be-admitted terminal seeking admission to the shared access network.

23. The system of claim 21, wherein the terminal comprises an already-admitted terminal seeking increased bandwidth allocation to support a committed information service session commensurate with the guaranteed CIR aspect of the bandwidth requirements of the terminal.

24. The system of claim 21, wherein the terminal comprises an already-admitted terminal to be reassigned to accommodate admission of a to-be-admitted terminal seeking admission to the shared access network.

25. The system of claim 21, wherein the terminal comprises an already-admitted terminal to be reassigned to accommodate admission of an already-admitted terminal seeking increased bandwidth allocation to support a committed information service session commensurate with the guaranteed CIR aspect of the bandwidth requirements of the terminal.

* * * * *